US006816199B1

(12) United States Patent
Ide (10) Patent No.: US 6,816,199 B1
(45) Date of Patent: Nov. 9, 2004

(54) FOCUS DETECTING DEVICE

(75) Inventor: Masataka Ide, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/579,168

(22) Filed: May 25, 2000

(30) Foreign Application Priority Data

May 26, 1999 (JP) .......................................... 11-146517

(51) Int. Cl.[7] .............................................. G03B 13/00
(52) U.S. Cl. ....................... 348/350; 348/347; 348/351; 348/315; 348/323
(58) Field of Search ................................ 346/267, 344, 346/360, 345, 350, 348, 340, 335

(56) References Cited

U.S. PATENT DOCUMENTS

| 5,051,770 | A | * | 9/1991 | Cornuejols ................... 396/125 |
| 5,218,395 | A | * | 6/1993 | Taniguchi et al. ............ 396/99 |
| 5,614,950 | A | * | 3/1997 | Park et al. ................... 348/315 |
| 5,995,144 | A | * | 11/1999 | Sasakura ..................... 348/350 |

FOREIGN PATENT DOCUMENTS

| JP | 7-281080 | 10/1995 |
| JP | 8-262564 | 10/1996 |
| JP | 9-274130 | 10/1997 |

* cited by examiner

Primary Examiner—Wendy R. Garber
Assistant Examiner—Chriss S. Yoder, III
(74) Attorney, Agent, or Firm—Straub & Pokotylo; John C. Pokotylo (57) ABSTRACT

This invention provides an inexpensive image pick-up device which can enhance the focus detecting precision and reduce the time lag due to focus adjustment without using an exclusive-use AF sensor different from an image pick-up element. In the image pick-up device of this invention, a light beam which has passed through a photographing lens is electronically image-picked up in an image pick-up area of the image pick-up element. A light beam which is at least part of a light beam of a subject having passed through the photographing lens is guided to a focus detecting optical system by an optical member and focused to re-form an image on a focus detecting area of the image pick-up element. The image pick-up element has microlenses arranged only on the front surface of the image pick-up area. A color filter member is arranged on the front surface of a light receiving section of the image pick-up area. No microkenses are disposed on the light receiving section of the focus detecting area and a transparent flattening layer is formed thereon. Thus, a focus detecting light beam of the focus detecting optical system is focused to re-form an image on the light receiving section.

22 Claims, 9 Drawing Sheets

FOCUS DETECTING DEVICE

CROSS-REFERENCE TO RELATED APPLICATIONS

This application is based upon and claims the benefit of priority from the prior Japanese Patent Application No. 11-146517, filed May 26, 1999, the entire contents of which are incorporated herein by reference.

BACKGROUND OF THE INVENTION

This invention relates to a image pick-up device for taking photographs by use of an electronic image pick-up element and more particularly to a focus detecting device used in the image pick-up device.

Conventionally, various types of image pick-up devices using electronic image pick-up elements are proposed.

For example, in Jpn. Pat. Appln. KOKAI Publication No. 8-262564, there is disclosed a image pick-up device which is a camera of single-lens reflex type for forming an image for observation of a subject by use of a light beam from one photographing lens and has a solid-state image pick-up element instead of a film in the image recording section. In the image pick-up device, a TTL phase difference AF system is used.

Further, in Jpn. Pat. Appln. KOKAI Publication No. 9-274130, a video camera containing a TTL phase difference detecting unit in the photographing lens system is disclosed.

Further, in Jpn. Pat. Appln. KOKAI Publication No. 7-281080, a camera having an electronic view finder is disclosed. In the camera, a light receiving element area for range finding is provided in the image pick-up element for the electronic view finder and a light beam for the electronic view finder is divided and guided to the range finding light receiving element to detect the focus.

However, in the image pick-up device of single-lens reflex camera type disclosed in Jpn. Pat. Appln. KOKAI Publication No. 8-262564 and the video camera disclosed in Jpn. Pat. Appln. KOKAI Publication No. 9-274130, an AF sensor exclusively used for TTL phase difference detection is provided separately from the image pick-up element. Therefore, a problem that the cost is increased occurs.

Further, the camera disclosed in Jpn. Pat. Appln. KOKAI Publication No. 7-281080 is limited to a camera having an electronic view finder.

In addition, there is no concrete disclosure about the range finding light receiving element area, but if it is formed with the same structure as the image pick-up area, the following problem occurs.

Generally, microlenses are disposed on the image pick-up element, the focus detecting light beam of the AF optical system is vignetted by the microlens in the range finding light receiving element area and significant limb darkening occurs thereby causing the range finding precision to be markedly degraded or making it impossible to attain range-finding.

Further, color filters are generally regularly arranged on the front surface of the light receiving element of the image pick-up element and since the arrangement of the color filters is not taken into consideration in the range finding light receiving element area, color information is mixed, thereby making it impossible to attain range-finding.

Since the pitch of pixels of the image pick-up element is determined based on the required image quality of a photographing image, the pitch becomes extremely smaller in comparison with the pixel pitch for the necessary range finding precision in the range finding light receiving element area and it becomes over-specification.

Further, since the pixel area is small, a relatively long storage time is required. In addition, since the number of pixels used for range finding calculation is large, the range finding calculation time is increased and a time lag required for range finding is increased.

BRIEF SUMMARY OF THE INVENTION

Accordingly, an object of this invention is to provide a image pick-up device which is used for taking photographs by use of an electronic image pick-up element and in which it is not necessary to use an exclusive AF sensor which is provided separately from the image pick-up element, the cost thereof can be lowered, the focus detecting precision is enhanced and a time lag due to the focus adjustment can be reduced.

According to a first aspect of this invention, there is provided a image pick-up device comprising a photographing lens; an image pick-up element having an image pick-up area and focus detecting area, for electronically image picking-up a light beam which has passed through the photographing lens; a microlens member disposed only on the front surface of the image pick-up area among the image pick-up area and focus detecting area of the image pick-up element; a focus detecting optical system for re-forming an image on the focus detecting area on the image pick-up element by use of a light beam which is at least part of a light beam of a subject having passed through the photographing lens; an optical member for guiding a light beam which is at least part of the light beam of the subject having passed through the photographing lens towards the focus detecting optical system; and a focus detecting section for detecting the focus based on an output of the image pick-up element.

According to a second aspect of this invention, there is provided a image pick-up device comprising a photographing lens; an image pick-up element having an image pick-up area and focus detecting area, for electronically image picking-up a light beam which has passed through the photographing lens; a color filter member disposed only on the front surface of the image pick-up area among the image pick-up area and focus detecting area of the image pick-up element; a focus detecting optical system for re-forming an image on the focus detecting area on the image pick-up element by use of a light beam which is at least part of a light beam of a subject having passed through the photographing lens; an optical member for guiding a light beam which is at least part of the light beam of the subject having passed through the photographing lens towards the focus detecting optical system; and a focus detecting section for detecting the focus based on an output of the image pick-up element.

According to a third aspect of this invention, there is provided a image pick-up device for dividing a light beam having passed through a photographing lens by use of a main mirror, guiding the divided light beam towards the bottom of a mirror box by use of a sub-mirror, and re-forming an image on an image pick-up element for image pick-up via a phase difference type focus detecting optical system to detect a phase difference, wherein the image pick-up element has an image pick-up area used for electronically image picking-up a light beam having passed through the photographing lens and a focus detecting area used for detecting the focus, and optical elements provided for respective pixels are disposed on the front surface of the image pick-up area.

According to a fourth aspect of this invention, there is provided a camera comprising a photographing lens; an image pick-up element having a first light receiving area used for receiving a light beam having passed through the photographing lens to form an electronic video signal and a second light receiving area used for receiving a light beam having passed through the photographing lens to form a detection signal indicating the focused state of the photographing lens; optical elements provided for respective pixels and arranged not between the photographing lens and the second light receiving area but between the photographing lens and the first light receiving area; and a controller for deriving the focused state of the photographing lens based on the detection signal of the second light receiving area of the image pick-up element.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

There will now be described embodiments of this invention with reference to the accompanying drawings.

Figure 1:
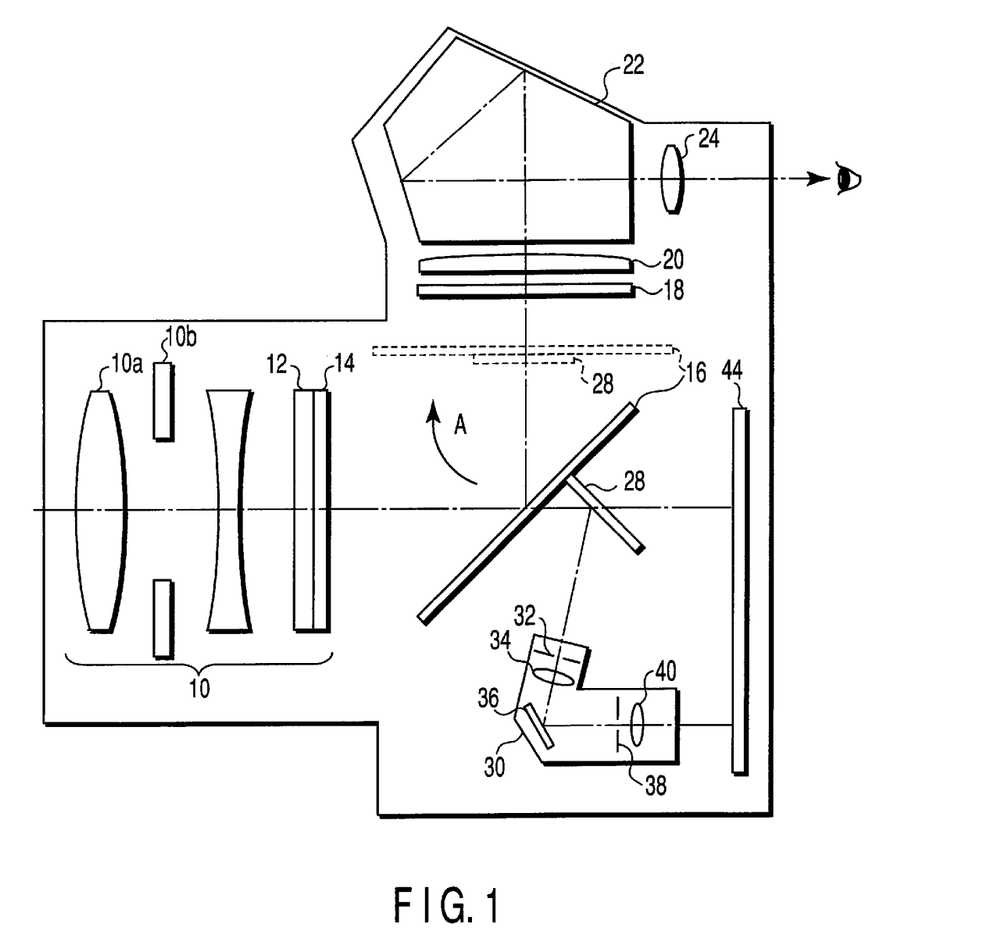
FIG. 1 is an optical path diagram of a camera which has an electronic image pick-up element and to which a image pick-up device according to a first embodiment of this invention is applied.

FIG. 1 is an optical path diagram of a camera which has an electronic image pick-up element and to which a image pick-up device according to a first embodiment of this invention is applied.

In FIG. 1, an image pick-up optical system 10 includes a focus adjusting optical system 10a and diaphragm 10b. The diaphragm 10b can hold a preset diaphragm opening and has a function of completely closing to shield the light.

After a light beam from the subject which has passed through the image pick-up optical system 10 passes through an infrared cut filter 12 for cutting off infrared components and an optical LPF (Low-Pass Filter) 14 for reducing moire, it reaches a main mirror 16 which is a half mirror and part of the light beam from the subject is reflected from the main mirror 16.

The part of the light beam from the subject which is reflected from the main mirror 16 reaches a pentaprism 22 via a focusing plate 18 and condenser lens 20 and forms an erect image in the pentaprism 22 and thus an image of the subject can be observed by an photographer by use of an eyepiece 24.

A different part of the light beam from the subject which has passed through the main mirror 16 is reflected from a sub-mirror 28 which is a total reflection mirror mounted on the main mirror 16 and guided to a focus detecting optical system 30.

The focus detecting optical system 30 includes a field-of-view mask 32, field lens 34, total reflection mirror 36, pupil mask 38 and image re-forming lens 40. The focus detecting optical system 30 focuses the focus detecting light beam to re-form an image on the focus detecting area on an image pick-up element 44.

When a subject image is photographed, the main mirror 16 and sub-mirror 28 are rotated in a direction A indicated by an arrow in FIG. 1 and set in a position indicated by broken lines. Thus, the photographing light beam is guided to an image pick-up area 62 of the image pick-up element 44 which will be described later.

Next, the focus detecting optical system is explained.

Figure 2A:
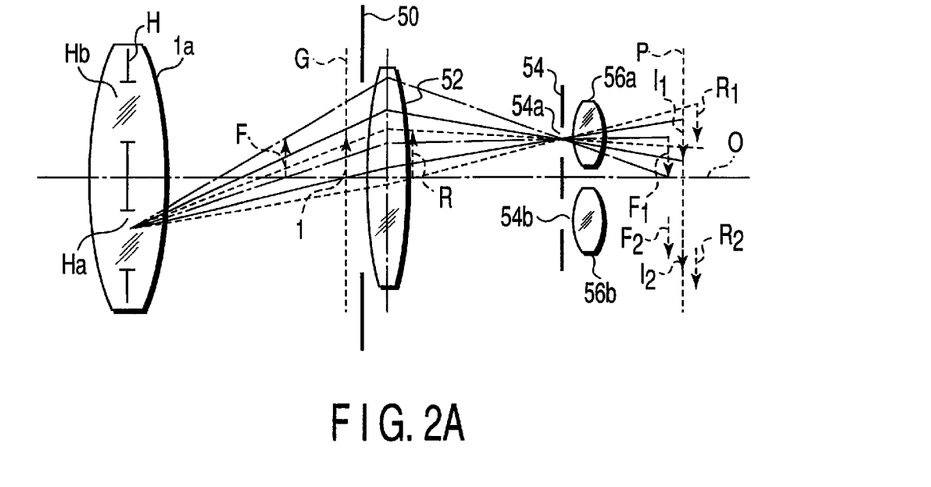
FIGS. 2A and 2B show the structure of a focus detecting optical system, FIG. 2A being a view showing the relation between an image and lenses and FIG. 2B being a perspective view showing a phase difference detecting optical system.
Figure 2B:
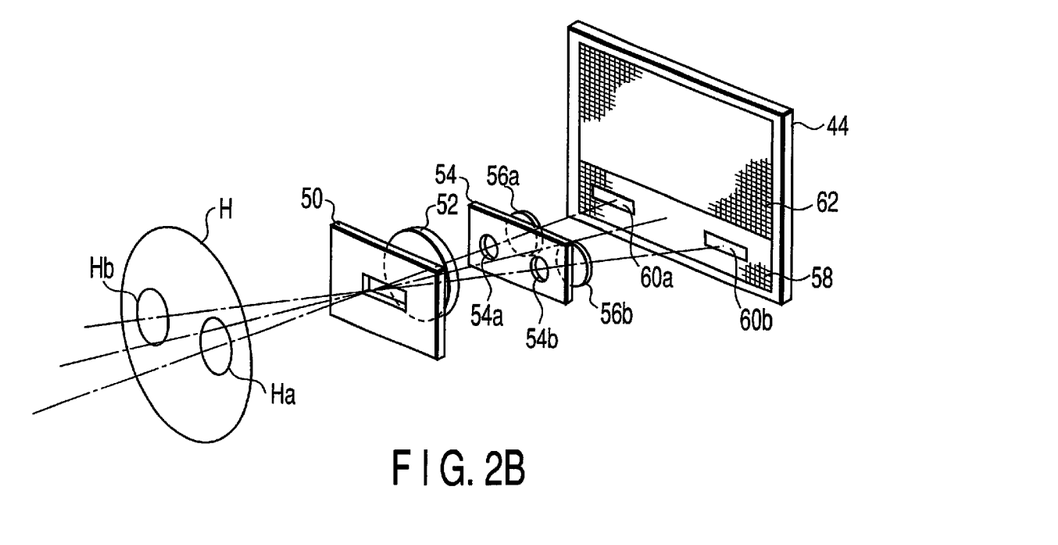

FIGS. 2A and 2B show the structure of the focus detecting optical system (phase difference detecting optical system) 30, FIG. 2A is a view showing the relation between an image and lenses and FIG. 2B is a perspective view showing the phase difference detecting optical system.

In FIGS. 2A and 2B, the main mirror 16, sub-mirror 28 and total reflection mirror 36 which are explained before are omitted for brevity of the explanation.

In FIGS. 2A and 2B, a light beam is made incident from the left side, and a filed-of-view mask 50, a field lens 52, a pupil mask 54 having opening portions 54a, 54b which are substantially symmetrically arranged with respect to the optical axis of the photographing lens 10 and image re-forming lenses 56a, 56b disposed in position corresponding to the opening portions 54a, 54b of the pupil mask 54 are sequentially arranged in this order behind the photographing lens 10.

Light beams made incident via areas Ha, Hb of an exit pupil H of the photographing lens 10 pass through the field-of-view mask 50, field lens 52, opening portions 54*a*, 54*b* of the pupil mask 54 and image re-forming lenses 56*a*, 56*b* to re-form an image on a focus detecting area 58 (P) of the image pick-up element 44.

When the photographing lens 10 is focused, that is, when a subject image I is formed on an image forming plane G, the subject image I is re-formed on areas 60*a*, 60*b* on the focus detecting area 58 (P) of the image pick-up element 44 which are secondary image forming planes perpendicular to the optical axis O by the field lens 52 and image re-forming lenses 56*a*, 56*b* and a first image $I_1$ and second image $I_2$ are obtained.

When the focus point of the photographing lens 10 is set in front of the exact focusing point, that is, a subject image F is formed in front of the image forming plane G, the subject image F is re-formed as a first image $F_1$ and second image $F_2$ which are set closer to the optical axis O and perpendicular to the optical axis O.

When the focus point of the photographing lens 10 is set behind the exact focusing point, that is, a subject image R is formed behind the image forming plane G, the subject image R is re-formed as a first image $R_1$ and second image $R_2$ which are set farther apart from the optical axis O and perpendicular to the optical axis O.

By detecting the distance between the first and second images, it becomes possible to detect the focusing state of the photographing lens 10 together with the front focusing state and rear focusing state. More specifically, the light intensity distributions of the first and second images are derived based on an image data output of the focus detecting area 58 of the image pick-up element 44 and then the distance between the images is measured.

In FIG. 2B, a reference numeral 62 indicates an image sensing area of the image pick-up element 44.

Figure 3:
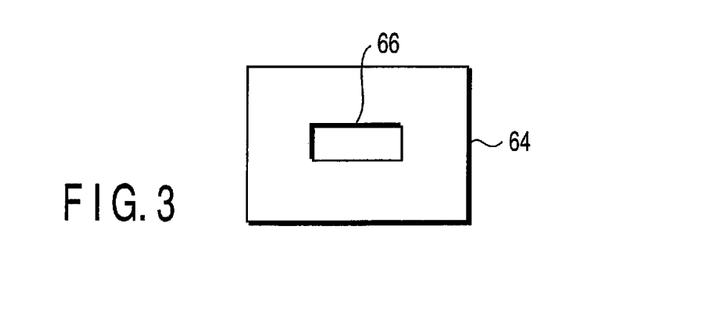
FIG. 3 is a view showing a focus detecting area in the photographing screen.

FIG. 3 is a view showing a focus detecting area 66 in a photographing screen 64.

Figure 4:
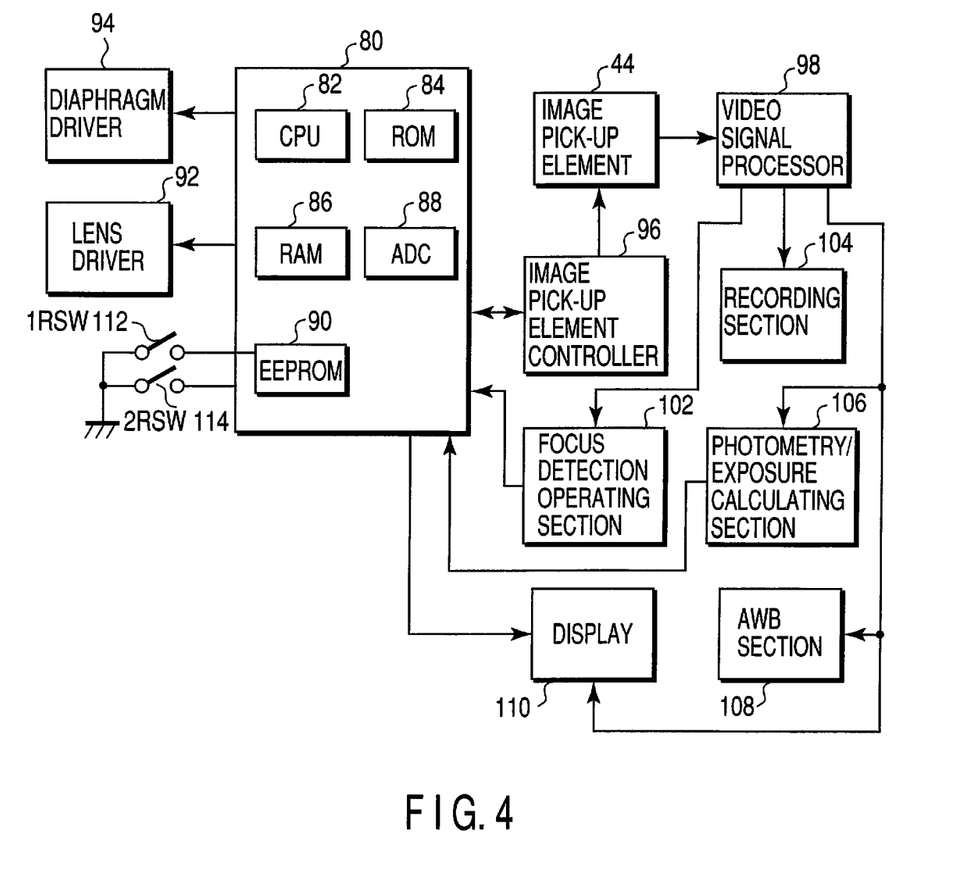
FIG. 4 is a block diagram showing the electrical construction of the camera according to the first embodiment.

Next, an electrical block diagram of the camera is explained with reference to FIG. 4.

A microcomputer 80 is a control device of the camera and is a controller having a CPU (Central Processing Unit) 82, ROM 84, RAM 86, A/D converter (ADC) 88, EEPROM 90 and the like contained therein. A series of operations of the camera is effected according to a sequence program stored in the ROM 84 in the microcomputer 80.

The EEPROM 90 stores correction data relating to focus adjustment, photometry/exposure calculation, auto white balance (AWB) for each camera.

To the microcomputer 80, a lens driving section 92 for driving the focus adjusting optical system 10*a* based on an instruction from the microcomputer 80 and a diaphragm driving section 94 for driving the diaphragm 10*b* based on an instruction from the microcomputer 80 are connected.

Further, an image pick-up element control section 96 for outputting a driving signal to the image pick-up element (CCD) 44 and controlling the operation thereof is connected to the microcomputer 80.

The image pick-up element 44 converts a subject image formed by the photographing optical system 10 to an electrical signal by image-sensing the subject image by use of the image sensing area 62. Further, it receives the focus detecting light beam in the focus detecting area 58 and converts the same to an electrical signal.

A video signal processing section 98 processes the electrical signal which is a pixel signal from the image pick-up element 44 to form a video signal. To the video signal processing section 98, a focus detection operating section 102, recording section 104, photometry/exposure calculating section 106, auto white balance section 108 and display section 110 are connected.

The focus detection operating section 102 effects the focus detecting operation based on the video signal processed by the video signal processing section 98. As the result of the focus detecting operation, determination data of focusing, the focusing lens driving amount and the like are supplied to the microcomputer 80.

The recording section 104 is used for storing a video signal (pixel data) output from a processing circuit 184 of the video signal processing section 98 which will be described later. The photometry/exposure calculating section 106 derives a photometric value and exposure control value based on the video signal processed in the video signal processing section 98.

Further, the image pick-up element control section 96 controls an electronic shutter of the image pick-up element 44 at the time of photographing based on the shutter speed output from the photometry/exposure calculating section 106. It controls the diaphragm 10*b* in the photographing optical system 10 at the time of photographing based on diaphragm opening value data derived by the exposure calculation of the photometry/exposure calculating section 106.

The auto white balance section 108 automatically controls white balance based on the video signal processed in the video signal processing section 98. Further, the display section 110 displays a video image photographed by the image pick-up element 44 and information on the internal portion of the camera by use of a display element such as an LCD and is controlled by the microcomputer 80.

A first release switch (1RSW) 112 and second release switch (2RSW) 114 are connected to the microcomputer 80. The first release switch 112 and second release switch 114 are switches interlocked with a release button (not shown), the first release switch 112 is turned ON by the first-stage depression of the release button and then the second release switch 114 is turned ON by the second-stage depression of the release button.

The microcomputer 80 effects the photometric and AF operations in response to the turn-ON state of the first release switch 112 and effects the exposure operation and image recording operation in response to the turn-ON state of the second release switch 114.

Next, the structure of the image pick-up element 44 is explained.

Figure 5:
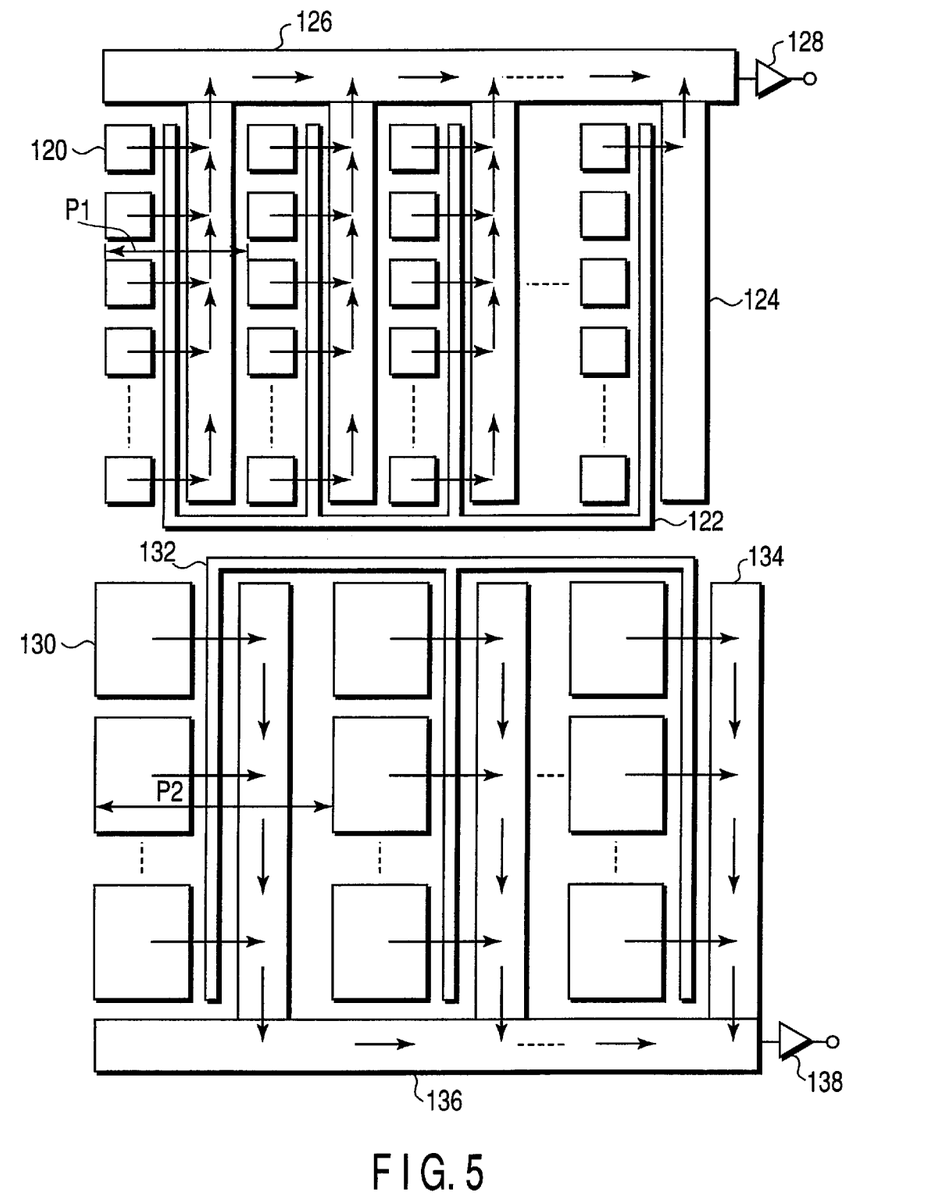
FIG. 5 is a view for illustrating the structure of the image pick-up element.

In FIG. 5, the image pick-up area 62 of the image pick-up element 44 includes photodiodes 120 two-dimensionally arranged in the horizontal and vertical directions, a transfer gate 122 for sequentially transferring charges stored in the photodiodes 120 to respective vertical shift register 124, the vertical shift register 124 for transferring the transferred charges in the vertical direction, a horizontal shift register 126 for sequentially transferring charges which are transferred in the vertical direction from the vertical shift register 124, and an output section 128 for converting the charges transferred in the horizontal direction from the horizontal shift register 126 into an electrical signal and outputting the electrical signal.

Like the image sensing area 62, the focus detecting area 58 of the image pick-up element 44 includes photodiodes 130 two-dimensionally arranged in the horizontal and vertical directions, a transfer gate 132 for transferring charges stored in the photodiodes 130 to respective vertical shift register 134, the vertical shift register 134 for transferring the transferred charges in the vertical direction, a horizontal shift register 136 for sequentially transferring charges which are transferred in the vertical direction from the vertical shift registers 124, and an output section 138 for converting the charges transferred in the horizontal direction from the horizontal shift register 136 into an electrical signal and outputting the electrical signal.

Microlenses are formed as optical elements on the front surface of the light receiving element photodiodes 120 of the image picking-up area 62.

As the technology for enhancing the light sensitivity of the image pick-up element, a so-called on-chip microlens technology for efficiently converging incident light to the light receiving section by forming microlenses in position corresponding to the respective photodiodes is provided.

Figure 6A:
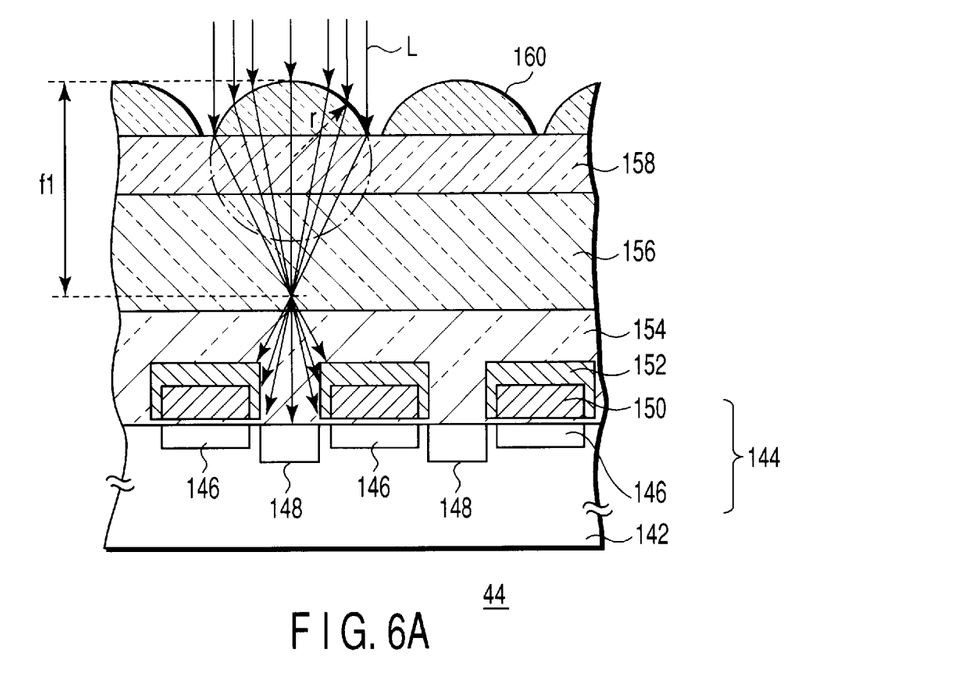
FIGS. 6A and 6B show the structure of the image pick-up element according to the first embodiment of this invention, FIG. 6A being a cross sectional view taken along the horizontal direction of the image pick-up area of the image pick-up element on which an on-chip microlens member is formed and FIG. 6B being a cross sectional view taken along a direction perpendicular to the horizontal direction of the focus detecting area.

FIG. 6A is a cross sectional view taken along a direction perpendicular to the transfer direction of the vertical shift register, that is, the horizontal direction of the image sensing area 62 of the image pick-up element 44 on which on-chip microlenses are formed.

Charge transfer portions 146 constituting a vertical shift register 144 and photodiodes constituting light receiving portions 148 are formed of diffusion layers or the like in a semiconductor substrate 142 formed of silicon. Vertical transfer electrodes 150 are formed on the respective charge transfer portions 146 with an insulating film (not shown) disposed therebetween. Further, light shielding films 152 are formed to cover the vertical transfer electrodes 150. The light receiving portions 148 are formed between the light shielding films 152.

A transparent flattening layer 154 is formed on the light receiving portions 148 and light shielding films 152 to cover them. A color filter 156 as an optical element and transparent flattening layer 158 are sequentially formed on the transparent flattening layer 154.

Further, microlenses 160 having spherical surfaces with the preset radius r of curvature and focal distance f1 are formed on the transparent flattening layer 158.

Figure 6B:
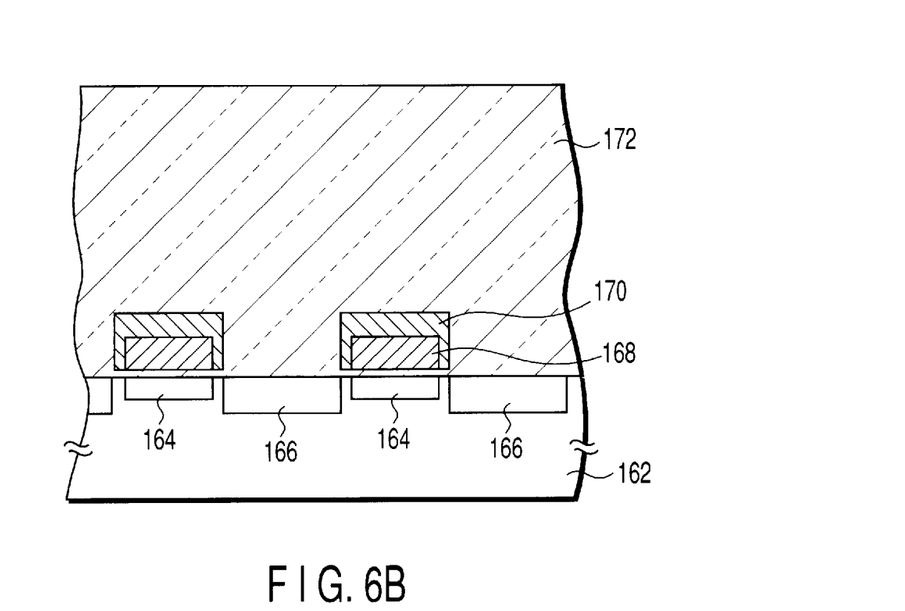

FIG. 6B is a cross sectional view taken along a direction perpendicular to the transfer direction of the vertical shift register, that is, the horizontal direction of the focus detecting area 58.

As shown in FIG. 6B, microlenses such as those formed in the image sensing area 62 are not formed in the focus detecting area 58.

As described before, the microlenses on the image pick-up element are so set as to be effective for the light beam vertically incident on the photographing plane and formed to be used for a so-called telecentric photographing optical system (an optical system having an exit pupil of infinite distance).

Therefore, if the microlensses are formed on the photodiodes of the focus detecting area 58, the light beam for focus detection of the focus detecting optical system 30 is vignetted by the effect of the microlenses and the peripheral portion of the focus detecting area becomes dark. As a result, the focus detecting precision is lowered or it becomes impossible to effect the focus detecting operation.

In order to solve the above problem, the focus detecting area 58 is formed as follows.

That is, charge transfer portions 164 and photodiodes constituting light receiving portions 166 are formed in a semiconductor substrate 162 formed of silicon. Vertical transfer electrodes 168 are formed on the charge transfer portions 164 with an insulating film (not shown) disposed therebetween. Further, light shielding films 170 are formed to cover the vertical transfer electrodes 168. The light receiving portions 166 are formed in position corresponding to the openings of the light shielding films 170.

A transparent flattening layer 172 is formed on the photodiodes of the focus detecting area 58 without forming the microlenses. As a result, the light beam for focus detection of the focus detecting optical system 30 is focused to re-form an image on the light receiving portion 166.

Further, the color filters 156 are formed on the front surfaces of the photodiodes 120 of the image pick-up area 62. The color filters 156 are arranged in a so-called Bayer array as shown in FIG. 7.

Figure 7:
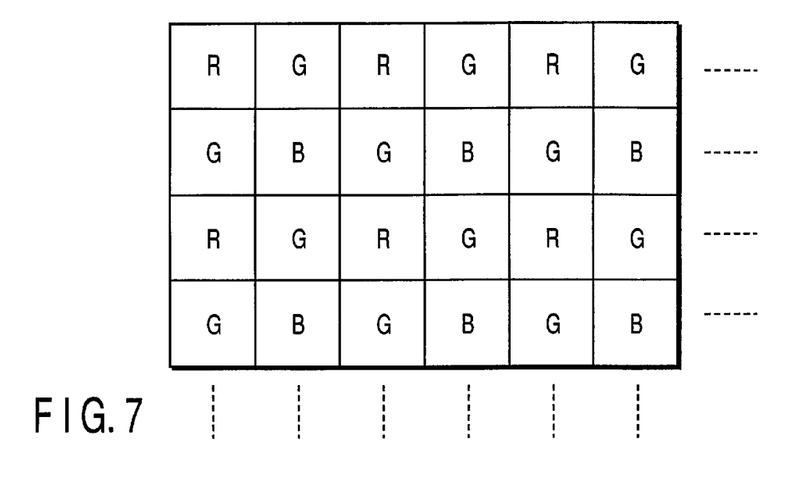
FIG. 7 is a view showing an example of the arrangement of color filters.

In the array of the color filters shown in FIG. 7, R, G, B show color filters for selectively permitting red, green, blue lights to be transmitted.

In the focus detecting area 58, no color filters are formed on the front surfaces of the photodiodes. This is because color information is not necessary for focus detection.

In this case, the pitch and area of the photodiodes 130 of the focus detecting area 58 are larger than the pitch and area of the photodiodes 120 of the image pick-up area 62.

The pixel pitch of the image pick-up area 62 is determined according to the necessary photographing resolution and if the pitch is set at P1, the pixel pitch in the focus detecting area 58 is set larger (the resolving power for the image plane is low). The pixel pitch in the focus detecting area 58 is determined according to the necessary focus detecting precision.

As to the focus detecting precision, it is known that focus can be detected with the precision of $\frac{1}{100}$ to $\frac{1}{200}$ of the detection pitch by the known interpolation operation or the like.

As the focus adjusting precision necessary for the image pick-up element, it is known that the detection precision of $2 \cdot P1$ or less is required if the pixel pitch of the image pick-up area 62 is set at P1. Therefore, even if the detection pitch P2 (the pitch in the pupil dividing direction) of the photodiodes 130 of the focus detecting area 58 is set to 10 times the pixel pitch P1, for example, a margin of approx. 20 times the limit of the detection precision can be obtained ($10 \cdot P1 \cdot (\frac{1}{100})$ $<< 2 \cdot P1$) and there occurs no problem on the focus detecting precision.

The area of the photodiode 130 of the focus detecting area 58 is set larger than the area of the photodiode 120 of the image pick-up area 62.

Therefore, storage time for light of the subject with the same illuminance can be reduced and a time lag of the focus detecting operation can be reduced.

Figure 8:
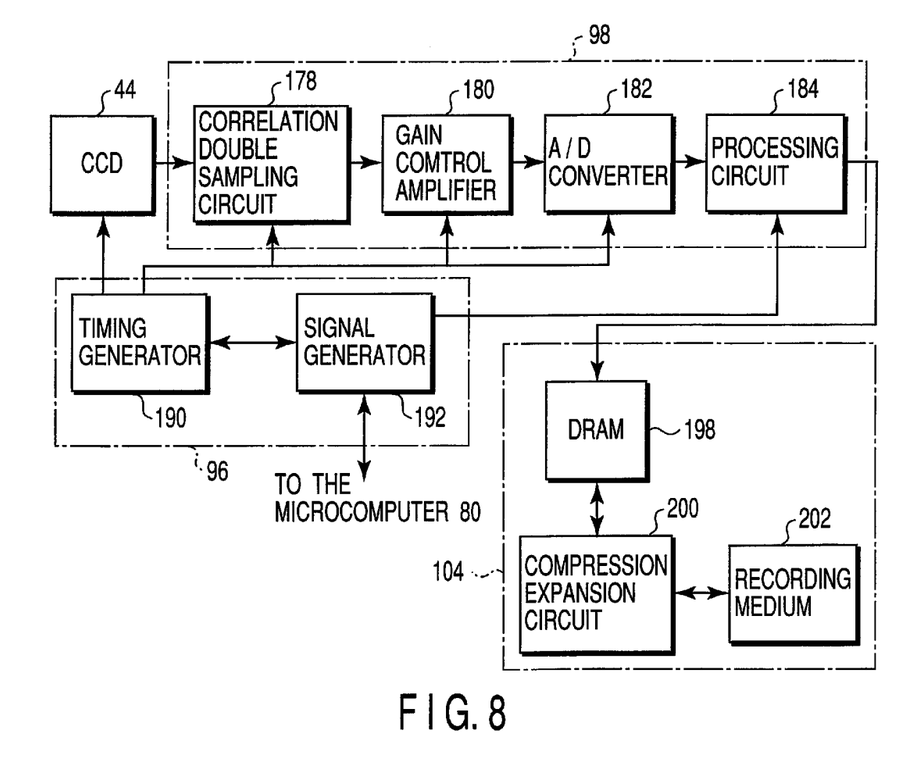
FIG. 8 is a block diagram showing the construction of a video signal processing section and a peripheral section thereof.

FIG. 8 is a block diagram showing the construction of a video signal processing section 98 and a peripheral section thereof.

In FIG. 8, a correlation double sampling circuit (CDS) 178 is a circuit for eliminating reset noises and the like from the image signal of the image pick-up element (CCD) 44. An output from the correlation double sampling circuit 178 is supplied to a gain control amplifier (AMP) 180 and amplified with a preset gain.

An output (signal) of the gain control amplifier 180 is A/D converted into a digital signal in an A/D converter 182. Then, various processes for the video signal converted into the digital signal are effected in a process execution circuit 184.

The image pick-up element control section (CCD control section) 96 outputs a driving signal to the image pick-up element (CCD) 44 to control the operation thereof and includes a timing generator (TG) 190 and signal generator (SG) 192.

The timing generator 190 generates a driving signal such as a transfer pulse for driving the image pick-up element 44 and generates a sample-hold pulse of the correlation double sampling circuit 178 and A/D conversion timing pulse of the A/D converter 182. The signal generator 192 generates a signal for attaining synchronization between the timing generator 190 and the microcomputer 80.

The recording section 104 includes a DRAM 198, compression/expansion circuit 200 and recording medium 202.

The DRAM 198 is a memory for storing a video signal (pixel data) output from the processing circuit 184 in the video signal processing section 98. The compression/expansion circuit 200 compresses pixel data stored in the DRAM 198 to record the same with the data amount reduced and expands the compressed data read out from the recording medium 202. The recording medium 202 records the compressed still picture data.

Next, the operation of the main routine of the camera according to the embodiment of this invention is explained with reference to the flowchart of FIG. 9 and the timing chart of FIG. 10.

When a power supply switch (not shown) is turned ON or a battery is inserted into the main body of the camera, the operation of the microcomputer 80 is started to execute a sequence program stored in the ROM 84 of the microcomputer 80.

First, in the step S1, the blocks of the camera are initialized. Then, in the step S2, the state (ON/OFF) of the first release switch (1RSW) 112 is detected.

In this case, if the first release switch 112 is set in the OFF state, the step S3 is effected and the storing (exposing) operation in the image pick-up area 62 of the image pick-up element 44 and the image pick-up operation which is the reading operation are effected.

After this, in the step S4, photometry/exposure calculation is made by the photometry/exposure calculating section 106 based on the video signal of the image pick-up area 62 from the video signal processing section 98. Then, the diaphragm control value of the diaphragm 12, the electronic shutter speed of the image pick-up element 44 and the like at the time of actual exposing (image recording) are calculated. After this, the step S2 is effected.

If it is detected in the step S2 that the first release switch 112 is turned ON, the step S5 is effected and the storing operation (exposure for AF) of the areas 60a, 60b in the focus detecting area 62 of the image pick-up element 44 is effected. Then, in the step S6, image signals of the light receiving areas 60a, 60b for focus detection are read out and the focus detecting operation based on the image signals is effected.

In the step S7, whether the result of the focus detecting operation indicates a focused state or out-of-focus state is determined. If it indicates the focused state, the step S9 is effected. If it indicates the out-of-focus state, the step S8 is effected, a moving distance of the focusing lens 10a for attaining the focused state is calculated based on the result of the focus detection calculation and the lens is driven accordingly. After this, the step S2 is effected and the AF operation is repeatedly effected.

In the step S9, whether the second release switch (2RSW) 114 is set in the ON state or not is determined. If the second release switch 114 is set in the ON state, the step S10 is effected. If the second release switch 114 is set in the OFF state, the step S2 is effected and the AF operation is continuously effected while waiting for the second release switch 114 to be turned ON.

After the step S10, the actual exposing operation is effected.

That is, in the step S10, the diaphragm driving section 94 is controlled by the microcomputer 80 to set the opening of the diaphragm 10b to a diaphragm opening value for exposure.

Then, in the step S11, a charge sweep-off signal SUB is set OFF by the image pick-up element control section 96, storage of the image pick-up element 44 is started and the exposing operation (actual exposure) is effected while it is controlled by the electronic shutter speed based on the calculation for exposure. In the electronic shutter operation, a charge transfer pulse TGP is generated at preset timing corresponding to the shutter speed by the image pick-up element control section 96 and the storage charges in the photodiodes 120 are transferred to the vertical shift register 124.

Next, in the step S12, in order to prevent occurrence of smear, the diaphragm driving section 94 is controlled to completely close the diaphragm 12b and the image pick-up element 44 is set in the light shielding state.

Next, in the step S13, an image readout signal DCLK is output to the image pick-up element 44 by the image pick-up element control section 96 while the image pick-up element 44 is set in the light shielding state. Then, an image signal (CCD signal) of the image pick-up area 62 which is output in synchronism with the image readout signal DCLK is A/D-converted and read out by the video image processing section 98.

In the step S14, the diaphragm driving section 94 is controlled by the microcomputer 80 and a command for opening the diaphragm is supplied to set the diaphragm 10b into the open state. Further, in the step S15, a process such as compression of the readout image signal is effected and then the processed signal is stored into the recording medium 202 in the recording section 104.

Then, the process is returned to the step S2 when a series of photographing operations is terminated and the same operation is repeatedly effected.

Next, a method for focus detecting calculation and storage operation for focus detection is explained.

Figure 9:
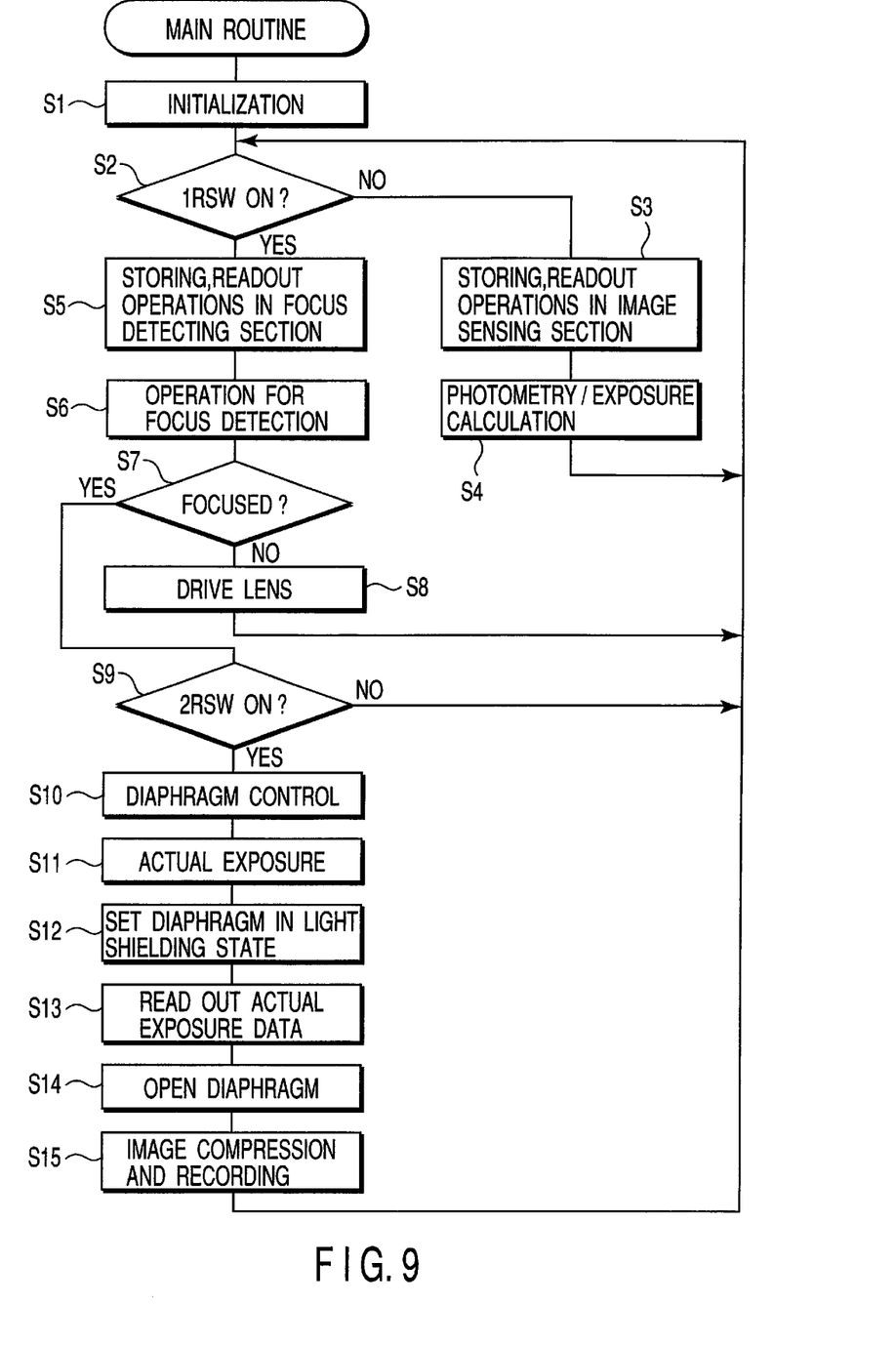
FIG. 9 is a flowchart for illustrating the main routine of a microcomputer in the first embodiment.
Figure 10:
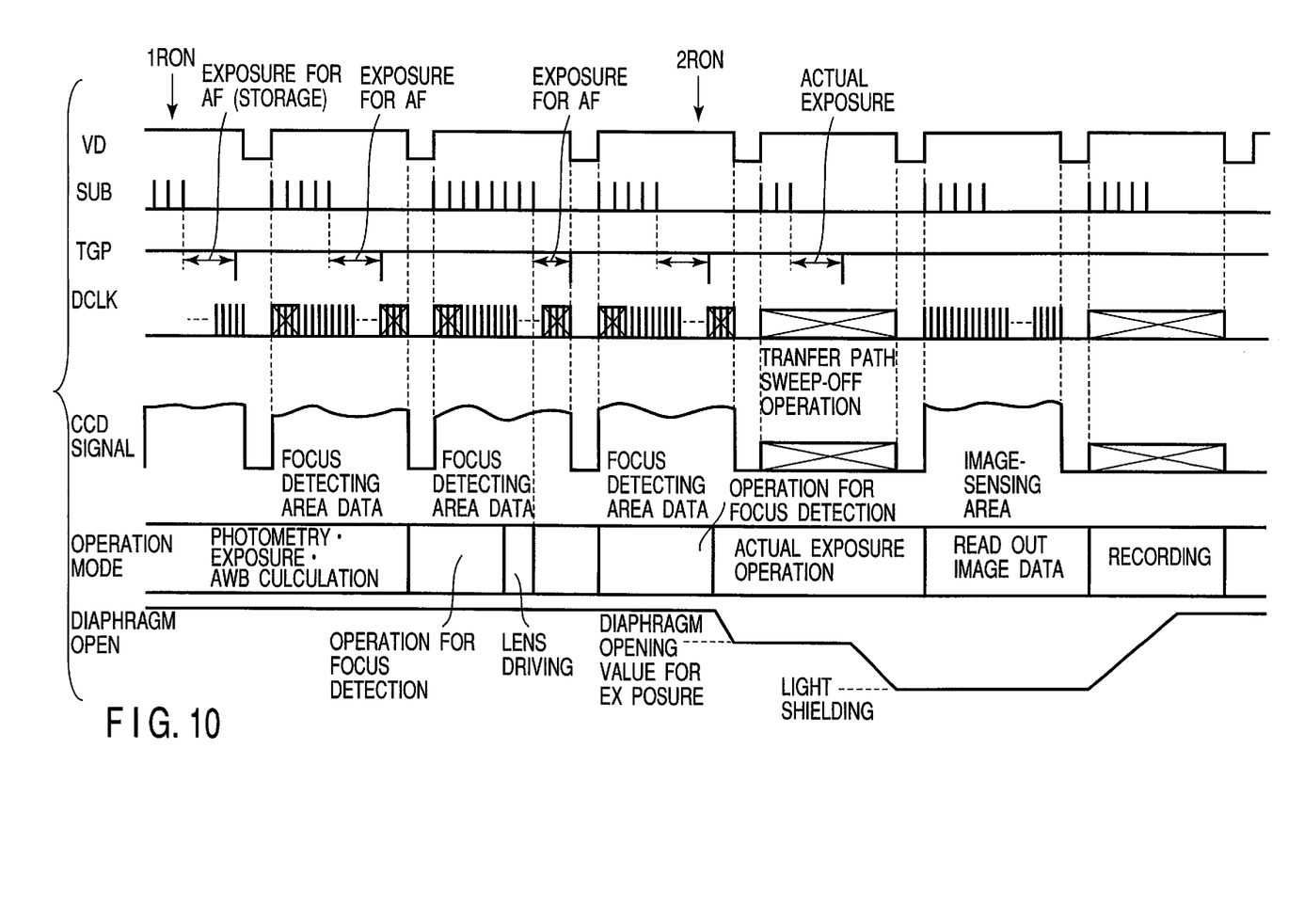
FIG. 10 is timing chart for illustrating the photographing operation in the first embodiment.
Figure 11:
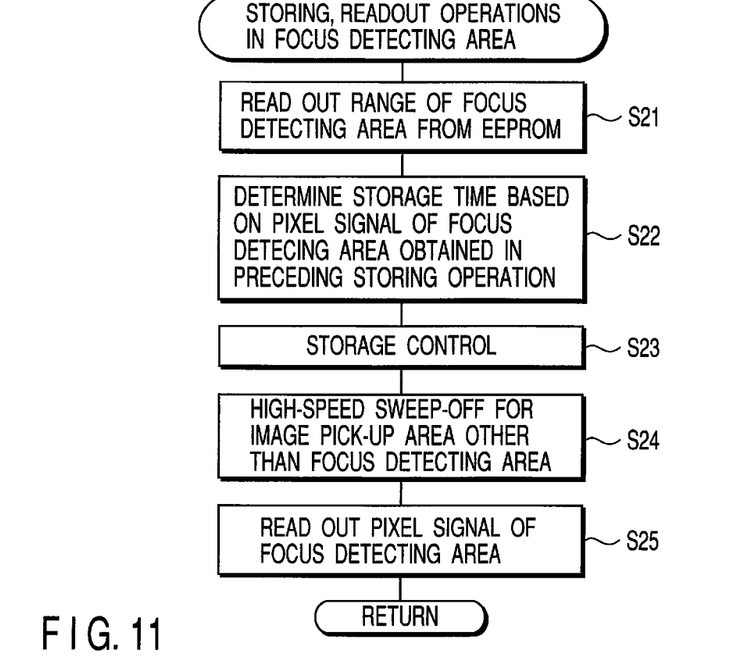
FIG. 11 is a flowchart for illustrating the storage/readout operation in the focus detecting area in the step S3 of the flowchart shown in FIG. 9.

FIG. 11 is a flowchart for illustrating the storage/readout operation in the focus detecting area 58 in the step S5 of the flowchart shown in FIG. 9.

First, in the step S21, data relating to the areas 60a, 60b in the effective pixel range in the focus detecting area 58 is read out from the EEPROM 90. Since the effective range is different for each camera, it is checked in the manufacturing factory at the time of manufacturing and programmed into the EEPROM 90 of each camera.

In the next step S22, pixel data in the focus detecting areas 60a, 60b obtained by the storage operation in the preceding cycle is referred to and storage time for obtaining an adequate pixel signal is derived. Then, in the step S23, the storage operation of the focus detecting area 58 of the image pick-up element 44 is controlled based on the storage time thus derived.

In the step S24, a pixel signal readout operation is effected. In this case, since the pixel signal from part of the focus detecting area 62 other than the focus detection effective areas 60*a*, 60*b* is not used for focus detection, a high-speed sweep-off operation is effected in order to reduce the readout time to minimum.

After this, in the step S25, pixel signals only for the focus detecting areas 60*a*, 60*b* which are the effective pixel range stored in the EEPROM 90 are read out.

Next, a second embodiment of this invention is explained.

Figure 12:
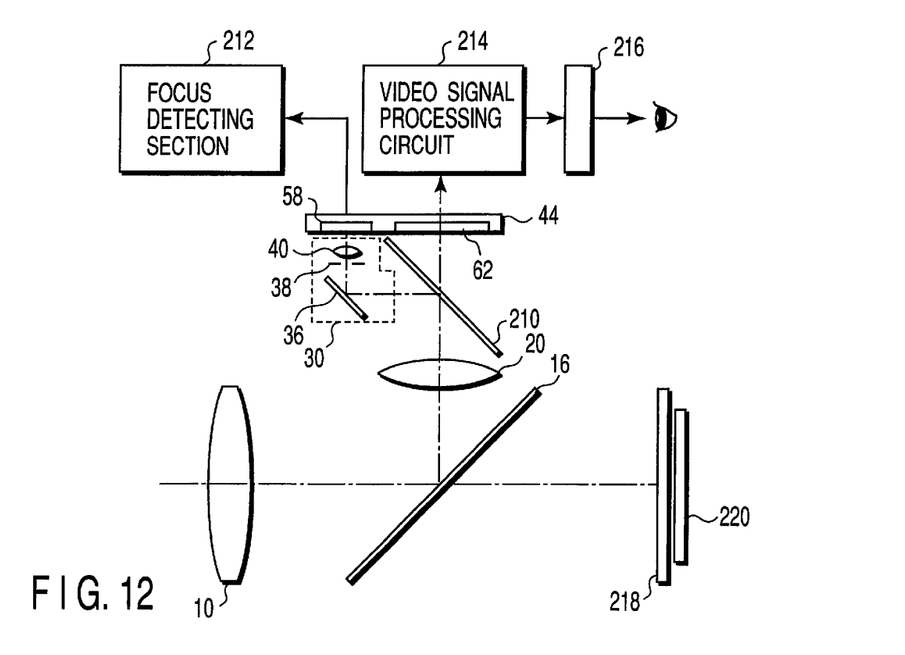
FIG. 12 is an optical path diagram showing the construction of a camera according to a second embodiment of this invention.

FIG. 12 is an optical path diagram showing the construction of a camera according to the second embodiment of this invention. The second embodiment indicates a case wherein the same image pick-up element as in the first embodiment is applied to the image pick-up device having an electronic view finder.

In FIG. 12, a light beam which has passed through an image pick-up lens 10 is reflected from a main mirror 16 which is a total reflection mirror and then guided to a finder system. The light beam reflected from the main mirror 16 passes through an reduction optical system 20 and part of the light beam which has passed through a half mirror 210 is made incident on an image pick-up area 62 of an image pick-up element 44.

Part of the light beam which is reflected from the half mirror 210 is focused to re-form an image on a focus detecting area 58 of the image pick-up element 44 by a pupil mask 38 and image re-forming lens 40 after the optical path thereof is bent by a total reflection mirror 36. The total reflection mirror 36, pupil mask 38 and image re-forming lens 40 constitute a focus detection optical system 30.

Image data of a focus detecting area 58 of the image pick-up element 44 is processed by a focus detecting section 212 to detect the focus.

Image data of the image pick-up area 62 of the image pick-up element 44 is read out and processed by a video signal processing circuit 214 and an image is displayed on a liquid crystal display section 216.

When pictures are taken on a film 220, the main mirror 16 is set into an evacuated position and the film 220 is exposed by use of a focal plane shutter 218.

In the embodiments described above, the image pick-up element is explained as a CCD, but a MOS sensor or other types of solid-state image pick-up elements can be used.

Further, this invention can be applied to a camera system having both of a film photographing system and a photographing system using the electronic image pick-up element.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A image pick-up device comprising:

a photographing lens;

an image pick-up element having an image pick-up area and focus detecting area, for electronically image picking-up a light beam which has passed through said photographing lens;

a microlens member disposed only on the front surface of the image pick-up area among the image pickup area and focus detecting area of said image pick-up element;

a focus detecting optical system for re-forming an image on the focus detecting area on said image pick-up element by use of a light beam which is at least part of a light beam of a subject having passed through said photographing lens;

an optical member for guiding the light beam which is at least part of the light beam of the subject having passed through said photographing lens towards said focus detecting optical system; and a focus detecting section for detecting the focus based on an output of said image pick-up element.

2. A image pick-up device according to claim 1, wherein the focus detecting area of said image pick-up element has a pixel pitch larger than that of the image pick-up area.

3. A image pick-up device according to claim 1, wherein a pixel area in the focus detecting area of said image pick-up element is larger than that in the image pick-up area.

4. A image pick-up device comprising:

a photographing lens;

an image pick-up element having an image pick-up area and focus detecting area, for electronically image picking-up a light beam which has passed through said photographing lens;

a color filter member disposed only on the front surface of the image pick-up area among the image pick-up area and focus detecting area of said image pick-up element;

a focus detecting optical system for re-forming an image on the focus detecting area on said image pick-up element by use of a light beam which is at least part of a light beam of a subject having passed through said photographing lens;

an optical member for guiding the light beam which is at least part of the light beam of the subject having passed through said photographing lens towards said focus detecting optical system; and a focus detecting section for detecting the focus based on an output of said image pick-up element.

5. A image pick-up device according to claim 4, wherein the focus detecting area of said image pick-up element has a pixel pitch larger than that of the image pick-up area.

6. A image pick-up device according to claim 4, wherein a pixel area in the focus detecting area of said image pick-up element is larger than that in the image pick-up area.

7. A image pick-up device for dividing a light beam which has passed through a photographing lens by use of a main mirror, guiding the divided light beam towards the bottom of a mirror box by use of a sub-mirror, and re-forming an image on an image pick-up element for image pick-up via a phase difference type focus detecting optical system to detect a phase difference, wherein said image pick-up element has an image pick-up area used for electronically image picking-up a light beam which has passed through the photographing lens and a focus detecting area used for detecting the focus, and optical elements which are provided for respective pixels are arranged on the front surface of the image pick-up area.

8. A image pick-up device according to claim 7, wherein said optical elements are color filters.

9. A image pick-up device according to claim 7, wherein said optical elements are microlenses.

10. A image pick-up device according to claim 7, wherein the focus detecting area has a pixel pitch larger than that of the image pick-up area.

11. A image pick-up device according to claim 7, wherein a pixel area in the focus detecting area is larger than that in the image pick-up area.

12. A image pick-up device according to claim 7, wherein the focus detecting area has resolving power lower than that of the image pick-up area.

13. A camera comprising:

a photographing lens;

an image pick-up element having a first light receiving area used for receiving a light beam which has passed through said photographing lens to form an electronic video signal and a second light receiving area used for receiving a light beam which has passed through said photographing lens to form a detection signal indicating the focused state of said photographing lens;

optical elements provided for respective pixels and arranged not between said photographing lens and the second light receiving area but between said photographing lens and the first light receiving area; and a controller for deriving the focused state of said photographing lens based on the detection signal of the second light receiving area of said image pick-up element.

14. A camera according to claim 13, wherein said optical elements are color filters.

15. A camera according to claim 14, wherein said color filters are filters disposed in corresponding positions for selectively permitting red, green and blue lights to pass therethrough.

16. A camera according to claim 13, wherein said optical elements are microlenses.

17. A camera according to claim 13, wherein the second light receiving area has a pixel pitch larger than that of the first light receiving area.

18. A camera according to claim 13, wherein a pixel area in the second light receiving area is larger than that in the first light receiving area.

19. A camera according to claim 13, wherein the second light receiving area has resolving power lower than that of the first light receiving area.

20. A camera according to claim 13, wherein the camera is an electronic camera capable of recording an image of a subject as an electronic video signal.

21. A camera according to claim 13, wherein the camera is a camera capable of recording an image of a subject as a latent image on a film.

22. A camera according to claim 21, further comprising a monitor for displaying the image of the subject electronically picked up.

* * * * *